US010691606B2

(12) United States Patent
Marani et al.

(10) Patent No.: US 10,691,606 B2
(45) Date of Patent: Jun. 23, 2020

(54) APPARATUS AND METHOD FOR SUPPORTING MULTIPLE CACHE FEATURES

(71) Applicant: ARM Limited, Cambridge (GB)

(72) Inventors: Davide Marani, Cambridge (GB); Alex James Waugh, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 15/392,190

(22) Filed: Dec. 28, 2016

(65) Prior Publication Data

US 2017/0228318 A1 Aug. 10, 2017

(30) Foreign Application Priority Data

Feb. 5, 2016 (GB) .................................. 1602080.2

(51) Int. Cl.
*G06F 12/00* (2006.01)
*G06F 12/0875* (2016.01)
(Continued)

(52) U.S. Cl.
CPC ...... *G06F 12/0875* (2013.01); *G06F 12/0864* (2013.01); *G06F 12/1027* (2013.01);
(Continued)

(58) Field of Classification Search
CPC ............. G06F 12/0875; G06F 12/0864; G06F 12/1027; G06F 2212/452; G06F 2212/60; G06F 2212/68
See application file for complete search history.

(56) References Cited

U.S. PATENT DOCUMENTS 6,434,668 B1 8/2002 Arimilli et al.
6,560,677 B1 5/2003 Bridges et al.
(Continued)

OTHER PUBLICATIONS

Combined Search and Exam Report for GB1602080.2 dated Jul. 25, 2016, 8 pages.
(Continued)

*Primary Examiner* — Kalpit Parikh
(74) *Attorney, Agent, or Firm* — Nixon & Vanderhye P.C.

(57) ABSTRACT

An apparatus and method are provided for supporting multiple cache features. The apparatus provides cache storage comprising a plurality of cache ways and organised as a plurality of ways groups, where each way group comprises multiple cache ways from the plurality of cache ways. First cache feature circuitry is provided to implement a first cache feature that is applied to the way groups, and second cache feature circuitry is provided to implement a second cache feature that is applied to the way groups. Way group control circuitry is then arranged to provide a first mapping defining which cache ways belong to each way group when the first cache feature is applied to the way groups, and a second mapping defining which cache ways belong to each way group when the second cache feature is applied to the way groups. The first mapping and the second mapping are selected so as to prevent application of a cache feature to the way groups by one of the cache feature circuits from interfering with the ability of the other cache feature circuit to access at least one cache way in each of the way groups. Such an approach alleviates the risk of actions taken by one of the cache features from interfering with the ability of the other cache feature to operate as intended.

13 Claims, 9 Drawing Sheets

(51) Int. Cl.
*G06F 12/0864* (2016.01)
*G06F 12/1027* (2016.01)

(52) U.S. Cl.
CPC .... *G06F 2212/452* (2013.01); *G06F 2212/60* (2013.01); *G06F 2212/68* (2013.01)

(56) References Cited

U.S. PATENT DOCUMENTS

| | | | | |
|---|---|---|---|---|
| 6,684,298 | B1* | 1/2004 | Dwarkadas | G06F 12/0864 |
| | | | | 711/128 |
| 2004/0059875 | A1 | 3/2004 | Garg et al. | |
| 2006/0143396 | A1* | 6/2006 | Cabot | G06F 12/121 |
| | | | | 711/134 |
| 2009/0077319 | A1* | 3/2009 | Kurokawa | G06F 1/3225 |
| | | | | 711/128 |
| 2012/0198172 | A1* | 8/2012 | Lin | G06F 12/0842 |
| | | | | 711/129 |
| 2015/0089143 | A1* | 3/2015 | Licht | G06F 12/0864 |
| | | | | 711/128 |
| 2015/0309939 | A1* | 10/2015 | Sadoughi-Yarandi | |
| | | | | G06F 12/0895 |
| | | | | 711/135 |
| 2016/0019157 | A1* | 1/2016 | Palacharla | G06F 12/0893 |
| | | | | 711/3 |
| 2017/0315921 | A1* | 11/2017 | Hooker | G06F 12/0846 |

OTHER PUBLICATIONS

Sundararajan et al., "Cooperative Partitioning: Energy-Efficient Cache Partitioning for High-Performance CMPs", 18$^{th}$ International Symposium on High Performance Computer Architecture (HPCA), Feb. 25-29, 2012 IEEE, pp. 1-12.

Examination Report dated Dec. 4, 2018 in GB Application No. 1602080.2, 7 pages.

* cited by examiner

| Cache way | Partial Cache Power Down group | Cache partitioning group |
|---|---|---|
| 0 | 0 | 0 |
| 1 | 0 | 1 |
| 2 | 0 | 2 |
| 3 | 0 | 3 |
| 4 | 1 | 0 |
| 5 | 1 | 1 |
| 6 | 1 | 2 |
| 7 | 1 | 3 |
| 8 | 2 | 0 |
| 9 | 2 | 1 |
| 10 | 2 | 2 |
| 11 | 2 | 3 |
| 12 | 3 | 0 |
| 13 | 3 | 1 |
| 14 | 3 | 2 |
| 15 | 3 | 3 |

FIG. 3

NUMBER OF WAYS W = 16

GRANULARITY $\left(\begin{array}{c}\text{WAYS PER}\\\text{GROUP}\end{array}\right)$ G = 4

NUMBER OF FEATURES
THAT COULD INTERFERE F = 2
WITH EACH OTHER

370 — NON-INTERFERING WITH FEATURE 1 BUT MAY BE INTERFERED WITH BY FEATURE 0

| CACHE WAY (355) | FEATURE 0 GROUPING (360) | FEATURE 1 GROUPING (365) | FEATURE 2 GROUPING | FEATURE 3 GROUPING (375) |
|---|---|---|---|---|
| 0 | 0 | 0 | 0 | 0 |
| 1 | 0 | 1 | 1 | 1 |
| 2 | 0 | 2 | 2 | 2 |
| 3 | 0 | 3 | 3 | 3 |
| 4 | 1 | 0 | 0 | 0 |
| 5 | 1 | 1 | 1 | 1 |
| 6 | 1 | 2 | 2 | 2 |
| 7 | 1 | 3 | 3 | 3 |
| 8 | 2 | 0 | 0 | 0 |
| 9 | 2 | 1 | 1 | 1 |
| 10 | 2 | 2 | 2 | 2 |
| 11 | 2 | 3 | 3 | 3 |
| 12 | 3 | 0 | 0 | 0 |
| 13 | 3 | 1 | 1 | 1 |
| 14 | 3 | 2 | 2 | 2 |
| 15 | 3 | 3 | 3 | 3 |

350

$F_0(0) = 0, 1, 2, 3$ $F_0(1) = 4, 5, 6, 7$ $F_0(2) = 8, 9, 10, 11$ $F_0(3) = 12, 13, 14, 15$

⟷ 1 WAY OVERLAP $F_1(0) = 0, 4, 8, 12$ $F_1(1) = 1, 5, 9, 13$ $F_1(2) = 2, 6, 10, 14$ $F_1(3) = 3, 7, 11, 15$

| CACHE WAY | FEATURE 0 GROUPING | FEATURE 1 GROUPING | FEATURE 2 GROUPING | FEATURE 3 GROUPING |
|---|---|---|---|---|
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 10 | 1 | 0 | 1 | 0 |
| 11 | 1 | 0 | 1 | 1 |
| 12 | 1 | 1 | 0 | 0 |
| 13 | 1 | 1 | 0 | 1 |
| 14 | 1 | 1 | 1 | 0 |
| 15 | 1 | 1 | 1 | 1 |

$F_0(0)$ = 0, 1, 2, 3, 4, 5, 6, 7

$F_0(1)$ = 8, 9, 10, 11, 12, 13, 14, 15

$F_1(0)$ = 0, 1, 2, 3, 8, 9, 10, 11

$F_1(1)$ = 4, 5, 6, 7, 12, 13, 14, 15

$F_2(0)$ = 0, 1, 4, 5, 8, 9, 12, 13

$F_2(1)$ = 2, 3, 6, 7, 10, 11, 14, 15

$F_3(0)$ = 0, 2, 4, 6, 8, 10, 12, 14

$F_3(1)$ = 1, 3, 5, 7, 9, 11, 13, 15

4 WAY OVERLAP

W = 8
G = 4
F = 3

| CACHE WAY | FEATURE 0 GROUPING | FEATURE 1 GROUPING | FEATURE 2 GROUPING |
|---|---|---|---|
| 0 | 0 | 0 | 0 |
| 1 | 0 | 0 | 1 |
| 2 | 0 | 1 | 0 |
| 3 | 0 | 1 | 1 |
| 4 | 1 | 0 | 0 |
| 5 | 1 | 0 | 1 |
| 6 | 1 | 1 | 0 |
| 7 | 1 | 1 | 1 |

$F_0(0) = 0, 1, 2, 3$ $F_0(1) = 4, 5, 6, 7$ $F_1(0) = 0, 1, 4, 5$ $F_1(1) = 2, 3, 6, 7$ $F_2(0) = 0, 2, 4, 6$ $F_2(1) = 1, 3, 5, 7$

2 WAY OVERLAP

FIG. 7

APPARATUS AND METHOD FOR SUPPORTING MULTIPLE CACHE FEATURES

This application claims priority to GB Patent Application No. 1602080.2 filed 5 Feb. 2016, the entire contents of which is hereby incorporated by reference.

FIELD

The present technique relates to an apparatus and method for supporting multiple cache features.

BACKGROUND

It is known to provide a cache device that includes cache storage having a plurality of cache ways, thus enabling the cache device to operate as a set associative cache (where a set comprises a corresponding entry in each of the ways).

It is sometimes desirable to provide a cache feature that can selectively be applied to a certain number of the cache ways. With this in mind, the available cache ways may be organised into a number of way groups, so that the cache feature can be applied to one or more of the way groups.

Whilst this can allow certain energy consumption or performance benefits to be realised dependent on the type of feature, it can give rise to an issue where multiple cache features are implemented, each of which may be applied to individual way groups. In particular, certain actions taken by one cache feature can interfere with the ability of the other cache feature to operate as intended.

Accordingly, it would be desirable to provide a mechanism that improves support for multiple cache features that may be applied to way groups within a cache storage.

SUMMARY

In a first example configuration, there is provided an apparatus, comprising: cache storage comprising a plurality of cache ways and organised as a plurality of way groups, each way group comprising multiple cache ways from said plurality of cache ways; first cache feature circuitry to implement a first cache feature that is applied to the way groups; second cache feature circuitry to implement a second cache feature that is applied to the way groups; and way group control circuitry to provide a first mapping defining which cache ways belong to each way group when the first cache feature is applied to the way groups and a second mapping defining which cache ways belong to each way group when the second cache feature is applied to the way groups, the first mapping and the second mapping being selected so as to prevent application of a cache feature to the way groups by one of the first cache feature circuitry and the second cache feature circuitry from interfering with the ability of the other of the first cache feature circuitry and the second cache feature circuitry to access at least one cache way in each of the way groups.

In another example configuration, there is provided a method of operating an apparatus having cache storage comprising a plurality of cache ways and organised as a plurality of way groups, each way group comprising multiple cache ways from said plurality of cache ways, the method comprising: implementing a first cache feature that is applied to the way groups; implementing a second cache feature that is applied to the way groups; employing a first mapping defining which cache ways belong to each way group when the first cache feature is applied to the way groups and a second mapping defining which cache ways belong to each way group when the second cache feature is applied to the way groups; and selecting the first mapping and the second mapping so as to prevent application of one of the first cache feature and the second cache feature to the way groups from interfering with the ability of the other of the first cache feature and the second cache feature to access at least one cache way in each of the way groups.

In a yet further example configuration, there is provided an apparatus, comprising: cache storage means for providing a plurality of cache ways and for being organised as a plurality of way groups, each way group comprising multiple cache ways from said plurality of cache ways; first cache feature means for implementing a first cache feature that is applied to the way groups; second cache feature means for implementing a second cache feature that is applied to the way groups; and way group control means for providing a first mapping defining which cache ways belong to each way group when the first cache feature is applied to the way groups and a second mapping defining which cache ways belong to each way group when the second cache feature is applied to the way groups, the first mapping and the second mapping being selected so as to prevent application of a cache feature to the way groups by one of the first cache feature means and the second cache feature means from interfering with the ability of the other of the first cache feature means and the second cache feature means to access at least one cache way in each of the way groups.

BRIEF DESCRIPTION OF THE DRAWINGS

The present technique will be described further, by way of example only, with reference to embodiments thereof as illustrated in the accompanying drawings, in which:

FIG. 3 is a table schematically illustrating how the membership of each way group may be altered in accordance with one embodiment, dependent on the cache feature being applied;

FIGS. 5 to 7 are tables showing how cache ways may be allocated to way groups on a feature dependent basis in accordance with three particular examples.

DESCRIPTION OF EMBODIMENTS

Figure 1:
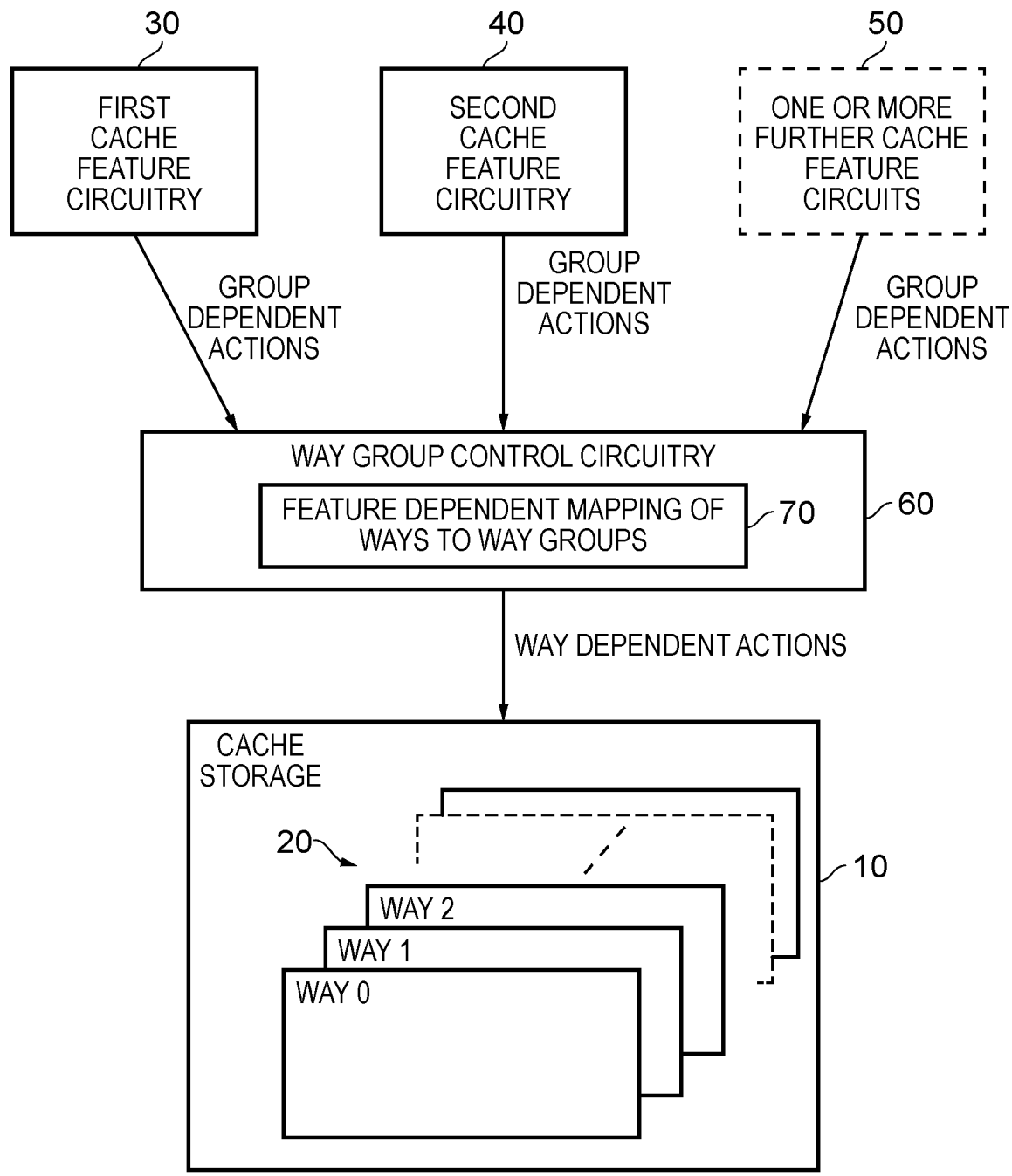
FIG. 1 is a block diagram of an apparatus in accordance with one embodiment.

Before discussing the embodiments with reference to the accompanying figures, the following description of embodiments is provided.

In accordance with one embodiment, an apparatus is provided that has cache storage comprising a plurality of cache ways and which is also organised as a plurality of way groups, where each way group comprises multiple cache ways from the plurality of cache ways. In addition, the apparatus provides first cache feature circuitry which implements a first cache feature that is applied to the way groups, and second cache feature circuitry that implements a second cache feature that is applied to the way groups. Further, way group control circuitry is provided to control how cache ways are mapped to each way group dependent on the feature being applied. In particular, the way group control circuitry provides a first mapping defining which cache ways belong to each way group when the first cache feature is applied to the way groups, and further provides a second mapping defining which cache ways belong to which cache way group when the second cache feature is applied to the way groups. Furthermore, the first and second mappings are selected so as to prevent application of a cache feature to the way groups by one of the cache feature circuits from interfering with the ability of the other of the cache feature circuits to access at least one cache way in each of the way groups. As a result, irrespective of an action taken by one of the cache feature circuits in respect of one of the way groups, the other cache feature circuit is able to access at least one cache way in each of the way groups (as per the mapping used for that cache feature circuit to define which cache ways belong to the way groups).

By using different mappings for the way groups dependent on the feature being applied, it is then possible to arrange the mappings so that the actions taken by one of the cache feature circuits do not interfere with the ability of the other of the cache feature circuits to apply its cache feature to the various way groups. This hence significantly improves usability within an apparatus where multiple cache features are provided that may be applied to individual way groups.

The various cache features can take a variety of forms. However, in one embodiment the first cache feature circuitry is arranged to apply the first cache feature in order to selectively inhibit access to the cache ways of one or more of the way groups as defined by the first mapping. However, due to the use of the first and second mappings as discussed above, even when the first cache feature causes access to the cache ways of one of the way groups to be prevented, the second cache feature circuitry is still able to access at least one cache way in each of the way groups, due to the difference in the manner in which the way groups are defined for the second cache feature circuitry and the first cache feature circuitry.

Indeed, in one embodiment it can be ensured by the use of the first and second mappings that, provided the first cache feature circuitry allows access to one of its way groups to be maintained, this will still allow the second cache feature circuitry to access at least one cache way in each of the way groups, having regard to how the way groups are defined for the second cache feature in accordance with the second mapping. Hence, this guarantees serviceability of all of the way groups for the second cache feature circuitry when the first cache feature circuitry retains access to at least one way group as defined by the first mapping.

There are a number of ways in which the first cache feature circuitry may selectively inhibit access to the cache ways of one or more of the way groups as defined by the first mapping. However, in one embodiment, the first cache feature is arranged to implement, as the first cache feature, a partial cache power down feature. Hence, in such an embodiment, the first cache feature circuitry is able to retain all of the way groups in a powered state, or to selectively power down individual way groups in order to conserve energy. Such an approach can reduce energy consumption, for example by reducing leakage power within the cache under light workload conditions. However, it will be appreciated that within an apparatus that also supports a second cache feature that may be applied to individual way groups, the application of the partial cache power down feature could significantly impact the ability of the second cache feature to be applied assuming the way groups were defined in the same way for both the first cache feature and the second cache feature. However, through use of the above described approach, whereby different mappings are defined for the different cache features, so that the cache way membership of each way group varies dependent on the cache feature being applied, this issue is alleviated, allowing the second cache feature to still be applied to individual way groups even in the presence of some of the way groups being powered down by the first cache feature circuitry.

The relationship between the first mapping and the second mapping can vary dependent on implementation. However, in one embodiment the first mapping and the second mapping are selected to ensure that any way group to which the first cache feature is applied has no more than half of its cache ways in common with any way group to which the second cache feature is applied. This has been found to provide an effective mechanism for ensuring that application of the first cache feature to individual way groups does not interfere with the ability to apply the second cache feature to individual way groups, and vice versa.

In one particular embodiment, the first mapping and the second mapping are selected to ensure that any way group to which the first cache feature is applied has only one cache way in common with any way group to which the second cache feature is applied. This can enable the number of individual way groups defined to be maximised whilst still ensuring that the actions of the first cache feature on individual way groups do not interfere with the actions of the second cache feature on individual way groups, or vice versa.

The above-described techniques can be applied when the number of cache features is increased. For example, in one embodiment the apparatus may further comprise at least one further cache feature circuitry to implement at least one further cache feature that is applied to the way groups. The way group control circuitry is then arranged to provide at least one further mapping defining which cache ways belong to each way group when said at least one further cache feature is applied to the way groups. Hence, the way group control circuitry provides a mapping for each cache feature supported by the apparatus.

In one embodiment, the various mappings defined by the way group control circuitry are arranged to ensure that actions taken by at least the first cache feature will not interfere with the ability of the other cache features to operate on the individual way groups. Accordingly, in one embodiment the first mapping and each further mapping are selected so as to prevent application of a cache feature to the way groups by one of the first cache feature circuitry and the corresponding further cache feature circuitry from interfering with the ability of the other of the first cache feature circuitry and the corresponding further cache feature circuitry to access at least one cache way in each of the way groups.

If application of the second cache feature to the individual way groups could also interfere with the ability of the at least one further cache feature circuitry to implement the corresponding at least one further cache feature, then the second mapping and each further mapping can be selected so as to prevent application of a cache feature to the way groups by one of the second cache feature circuitry and the corresponding further cache feature circuitry from interfering with the ability of the other of the second cache feature circuitry and the corresponding further cache feature circuitry to access at least one cache way in each of the way groups.

Hence, in principle, the above described techniques can be utilised to produce mappings that inhibit an arbitrary number of cache features that can be applied to individual way groups from interfering with each other.

However, in alternative embodiments, whilst the first cache feature may be such that it could interfere with the ability of the at least one further cache feature to operate correctly, it may be the case that the second cache feature will not cause any such interference. In that event, each further mapping may be arbitrarily selectable with respect to the second mapping. For example, in one embodiment each further mapping may be selected to be the same as the second mapping in situations where there is no potential for interference between the actions performed by the second cache feature and the actions performed by each of the further cache features. However, the above described steps taken with regard to the first mapping adopted for the first cache feature and the other mappings will still alleviate the potential for actions performed by the first cache feature to affect the correct operation of the second cache feature or any further cache feature provided by the apparatus.

In one embodiment, having regard to the number of cache features for which different mappings need to be provided, there will be a minimum number of cache ways that the cache storage must provide. In particular, in one embodiment, a minimum number of cache ways $W_{MIN}$ provided by the cache storage is $2^F$, where F is the number of cache features implemented by the apparatus for which different mappings are to be provided by the way group control circuitry.

Having worked out the minimum number of cache ways, then the actual number of cache ways provided by the cache storage may be set equal to that minimum number $W_{MIN}$. However, alternatively the number of cache ways W can be set equal to $2NW_{MIN}$ where N is a positive integer greater than 0.

Once the number of cache ways has been determined, then the number of cache ways to be provided in each way group can be selected taking into account both the number of cache ways W and the number of features F. In particular, in one embodiment, the number of cache ways in each way group is selected to be the nearest upper power of two to a value given by computing the square root of $W \cdot 2^{F-2}$.

In one embodiment, the way group control circuitry is arranged, for each mapping, to allocate each cache way to one way group. Accordingly, for each cache feature, each individual cache way will only appear in one way group, but which way group that cache way appears in will be dependent on the mapping defined by the way group control circuitry for the relevant cache feature.

The cache storage can take a variety of forms, but in one embodiment is one of a data cache, an instruction cache, a unified cache or a Translation lookaside buffer (TLB). The above described techniques may be applied to any apparatus that provides a cache storage that comprises a plurality of cache ways that can be organised into plurality of way groups.

Particular embodiments will now be described with reference to the Figures.

FIG. 1 is a block diagram of an apparatus in accordance with one embodiment. The apparatus includes a cache storage 10 that provides a plurality of cache ways 20. Through the provision of multiple cache ways, the cache storage can for example be arranged as an N-way set associative cache, where a specified address can be used to identify a corresponding entry in each of the N ways, those entries forming the "set".

Furthermore, in accordance with the described embodiments the various cache ways can be organised into a plurality of way groups (also referred to herein merely as "groups"), where each cache way is considered to be a member of one of those way groups. Certain of the functionality provided in association with the cache can then be arranged to be applied on a group-by-group basis.

For example, as shown in FIG. 1, multiple cache feature circuits 30, 40, 50 can be provided for implementing associated cache features that are applied in respect of the cache. Further, those cache features can be applied to specified way groups of the cache storage.

However, in accordance with the described embodiments, at least for a cache feature circuit whose actions could interfere with the actions undertaken by another cache feature circuit, the membership of each group is arranged to be different for those cache feature circuits. In particular, way group control circuitry 60 is arranged to maintain a feature dependent mapping 70 that is used to map the individual ways into the way groups. For any cache feature where application of that cache feature to the way groups may interfere with the operation of at least one other cache feature when applied to the way groups, a different way group membership is defined for that cache feature when compared with the way group membership defined for that at least one other cache feature.

For example, in one embodiment the first cache feature circuitry 30 implements a first cache feature which, when applied to the way groups, may affect the ability of the second cache feature circuitry 40 to apply its second cache feature on a group-by-group basis, were the groups to be interpreted in an identical manner for the first and second cache feature circuits. However, to alleviate this problem, the way group control circuitry 60 is arranged to identify a first mapping of ways to way groups for the first cache feature circuitry 30 and a second, different, mapping of ways to way groups for the second cache feature circuitry 40. In particular, the first mapping and the second mapping are selected so as to prevent application of a cache feature to the way groups by the first cache feature circuitry from interfering with the ability of the second cache feature circuitry to access at least one cache way in each of the way groups. Such an arrangement of first and second mappings also ensures that the actions of the second cache feature circuitry cannot interfere with the actions of the first cache feature circuitry, if such interference were otherwise a possibility.

As shown in FIG. 1, one or more further cache feature circuits 50 may also be provided, and each of those further cache feature circuits can also be provided with a different mapping if necessary. For example, if both the cache features applied by the first cache feature circuitry 30 and the second cache feature circuitry 40 could interfere with the activities of a further cache feature circuit 50, then a further mapping may be provided for that further cache feature circuit that ensures that, irrespective of actions taken by either the first cache feature circuit 30 or the second cache feature circuit 40 in respect of their associated groups, the further cache feature circuit will still be able to access at least one cache way in each of its way groups.

As schematically shown in FIG. 1, it will hence be seen that whilst the various cache feature circuits 30, 40, 50 may specify actions that are group dependent, and hence each such circuit may specify one or more groups for the associated cache feature to be applied to, the way group control circuitry 60 will map that group information to particular ways so that the cache storage 10 is instructed to perform way dependent actions, and need not have any knowledge per se of the individual groups. Furthermore, the way in which a particular group dependent action is mapped into the required way dependent actions will vary dependent on which cache feature circuit has requested that group dependent action to be applied.

Figure 2:
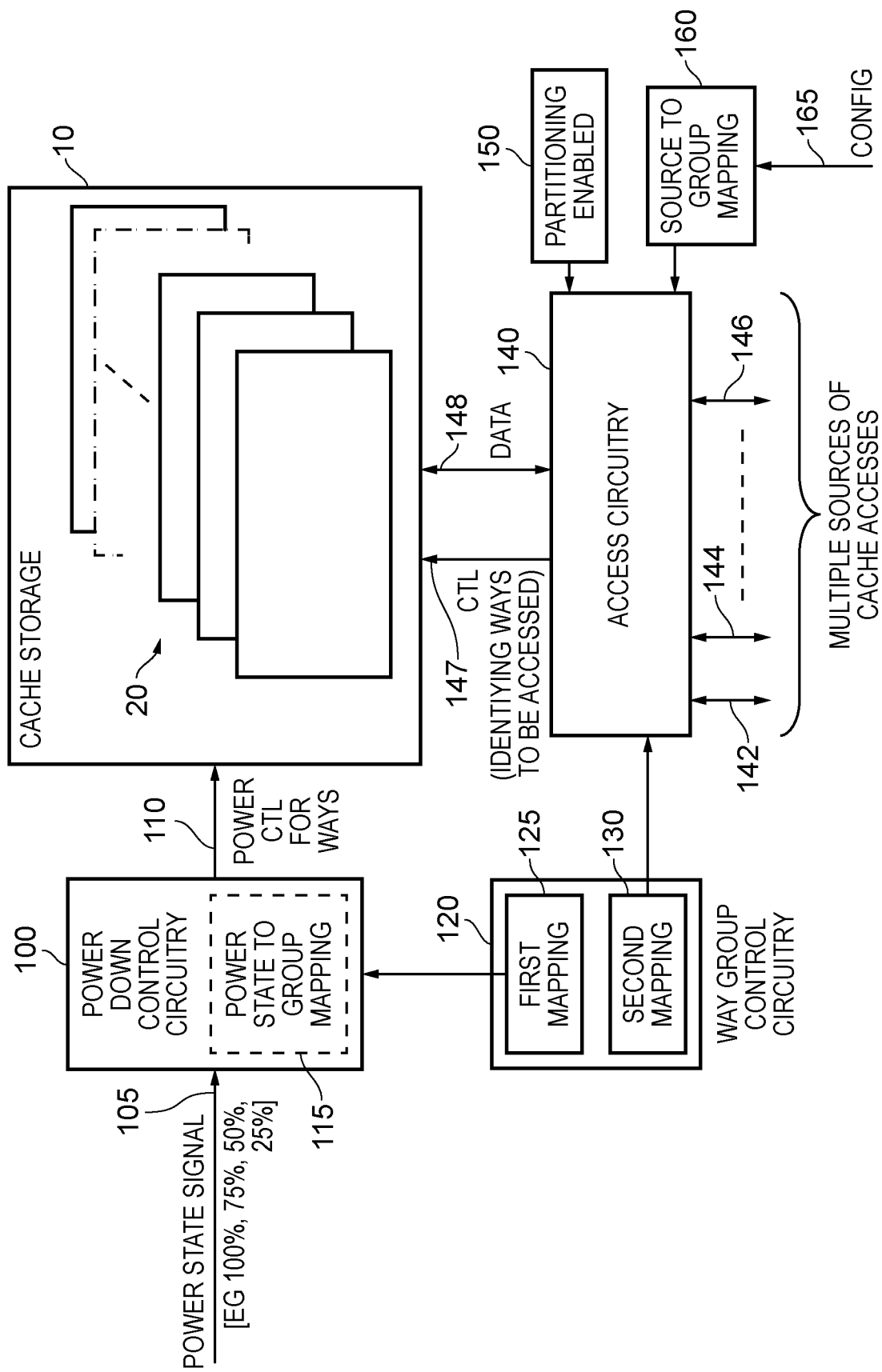
FIG. 2 is a block diagram illustrating an apparatus in accordance with one particular embodiment.

FIG. 2 is a block diagram illustrating a particular example arrangement where the first cache feature circuitry takes the form of power down control circuitry 100, and the second cache feature circuitry 40 takes the form of access circuitry 140. The way group control circuitry 120 shown in FIG. 2 includes a first mapping 125 used by the power down control circuitry 100 and a second mapping 130 used by the access circuitry 140. In one embodiment, the first and second mappings are predetermined, and selected in a manner that ensures that, provided the power down control circuitry 100 maintains at least one of its way groups in a powered state, the access circuitry 140 can access at least one cache way in each of its way groups.

As shown in FIG. 2, the power down control circuitry 100 may receive a power state signal 105 from a component within the system incorporating the cache apparatus shown in FIG. 2. The power down control circuitry 100 can consider the plurality of cache ways 20 of the cache storage 10 to be organised as a plurality of way groups, and dependent on the power state signal the power down control circuitry 100 can then selectively power down one or more of the groups of ways in order to reduce the effective size of the cache storage 10 under certain conditions. For example, such an approach can be used to reduce leakage power under light workload conditions. State 115 may be maintained within the power down control circuitry 100 to identify how the various values of the power state signal are mapped to particular groups to be retained in the powered state, or to be powered down. This state 115 can be fixed, or could if desired be configurable, for example by providing a storage element within the power down control circuitry that is updated as required to identify the mapping between the power state signals and the various groups.

Purely by way of example, in FIG. 2 it is assumed that the power state signal can indicate four possible power states, indicating 100%, 75%, 50% and 25%. With such an arrangement, the power down control circuitry may identify four way groups within the cache storage, with all of the way groups being powered up if the power state signal indicates 100%, one of the way groups being placed into a low power state if the power state signal indicates 75%, two of the way groups being placed into a low power state if the power state signal indicates 50%, and three of the way groups being placed into a low power state if the power state signal indicates 25%. The power state to group mapping information 115 can be used to identify which groups are powered down in dependence on those particular power states.

However, in addition, the first mapping 125 is used to identify exactly which ways are considered to be members of each such way group, and accordingly by using a combination of the information 115 and the first mapping 125, the power down control circuitry 100 can issue power control signals over path 110 for each of the various ways of the cache storage 10 dependent on the value of the power state signal.

The access circuitry 140 is used to perform various access operations, such as read and write operations, in respect of the cache storage 10 dependent on access requests issued by various sources over the paths 142, 144, 146 shown in FIG. 2. A storage element 150 can be used to identify whether partitioning is enabled or disabled. If partitioning is disabled, then any particular access request is processed with respect to the entirety of the cache storage, and hence for example will result in a lookup being performed in a corresponding entry in each of the cache ways 20. Access control signals can be issued to the cache over path 147 identifying the ways to be accessed, and data can be passed between the access circuitry and the cache storage in either direction over path 148. Hence, data can be written into an entry of a cache way to process a write access request, and data can be retrieved from an entry of a cache way to process a read access request.

However, if the storage element 150 identifies that partitioning is enabled, then accesses can be processed in respect of particular groups of the cache storage. In particular, cache partitioning is a technique that enables segregation between various sources of cache accesses with different types of workload. Hence, a particular processor core, or group of cores, may be arranged to utilise one or more way groups within the cache storage 10, whilst another core, or group of cores, may be arranged to use a different way group or way groups within the cache storage. This can give rise to performance benefits, by avoiding actions taken by one core impacting the efficient use of the cache by another core, which could otherwise occur for example due to one core evicting entries made by another core (so-called cache thrashing).

In accordance with such a cache partitioning approach, storage 160 can be used to identify a source to group mapping, with that information being configurable in one embodiment via a path 165. Hence, for each identified source of cache accesses that will communicate with the access circuitry 140, the information 160 can identify which way group or way groups that source should utilise when partitioning is enabled.

Accordingly, when the access circuitry 140 receives a cache access request from one such source, and partitioning is enabled, the information 160 can be utilised to identify which way group or way groups that source is allowed to access. Then, using the second mapping 130, the access circuitry 140 can convert that group information into an indication of which cache ways are to be accessed when processing the access request, with that information being identified within the control information routed to the cache storage over path 147. Alternatively, if desired, the lookup may still be performed within each of the powered on ways, but any result from ways that are not identified to be members of the relevant way group or way groups are ignored.

As mentioned earlier, the first mapping 125 and the second mapping 130 are arranged to be different, and in particular are arranged so as to prevent application of the partial power down cache feature by the power down control circuitry from interfering with the ability of the access circuitry to continue to access at least one cache way in each of the way groups. In particular, provided that the power down control circuitry keeps at least one of its way groups powered up, the second mapping will ensure that any of the sources can still access at least one cache way.

An example of how the first and second mappings can be arranged in order to achieve this is illustrated in FIG. 3, for the example of a cache storage that includes 16 cache ways, as shown by the column 205. In this example, it is assumed that there are four way groups, and that for the partial cache power down feature implemented by the power down control circuitry 100, the first mapping is as shown by the second column 210 in FIG. 3. In particular, cache ways 0 to 3 are provided within way group 0, cache ways 4 to 7 are provided within way group 1, cache ways 8 to 11 are provided within way group 2, and cache ways 12 to 15 are provided within way group 3.

Four way groups are also available for the cache partitioning functionality. However, it will be appreciated that if the membership of the way groups were maintained the same for both the partial cache power down feature and the cache partitioning feature, this could mean that certain sources were unable to access the cache at all when certain parts of the cache were powered down by the power down control circuitry.

However, to alleviate this problem, the mapping of cache ways to way groups used when applying the cache partitioning feature can take the form shown by the third column 220 in FIG. 3. In particular, in accordance with the second mapping, way group 0 contains the cache ways 0, 4, 8, 12 way group 1 contains the cache ways 1, 5, 9, 13, way group 2 contains the cache ways 2, 6, 10, 14, and way group 3 contains the cache ways 3, 7, 11, 15. As a result, it will be seen that, provided the power down control circuitry 100 maintains at least one of its way groups in a powered up state, all four of the way groups used by the cache partitioning feature will still have at least one member that can continue to be accessed, hence providing full serviceability of the cache partitioning feature.

Figure 4A:
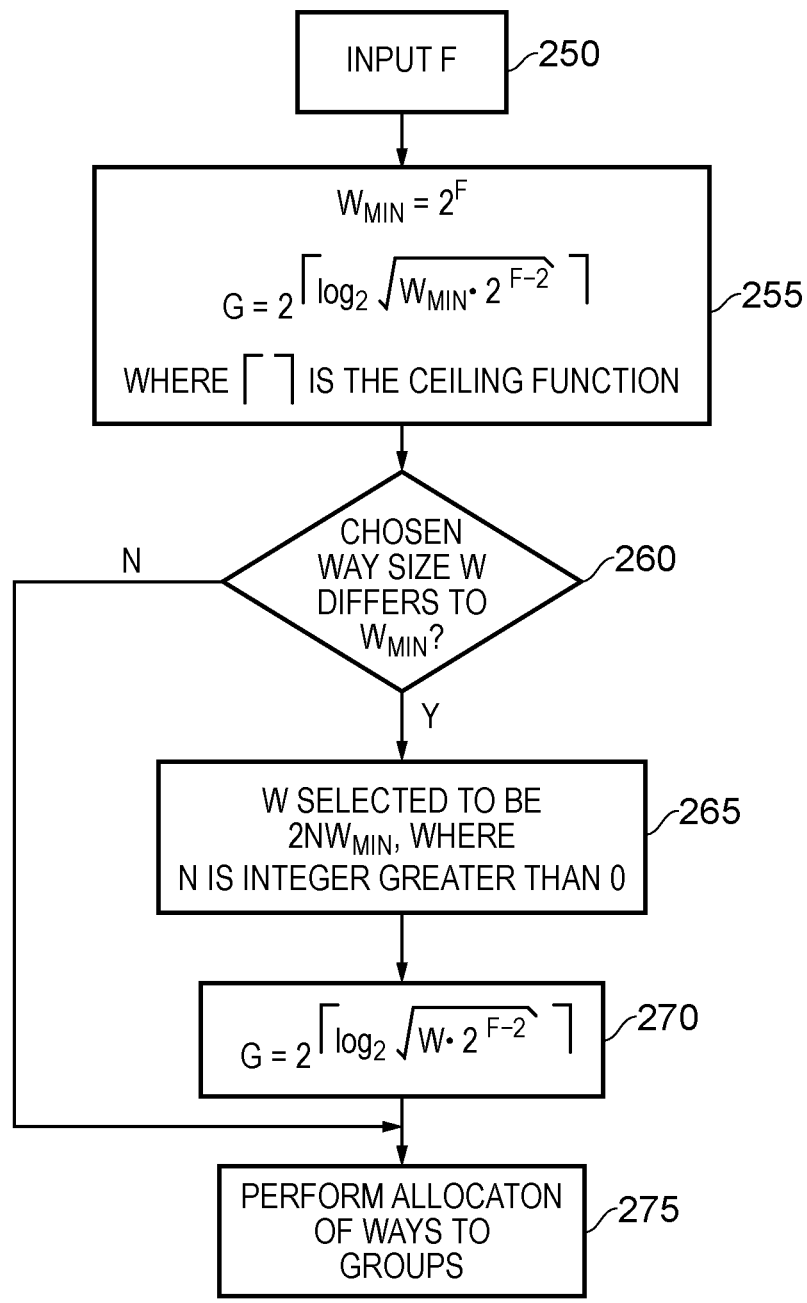
FIGS. 4A and 4B are flow diagrams illustrating operations that may be performed in accordance with one embodiment in order to allocate cache ways to way groups on a feature dependent basis.

FIG. 4A is a flow diagram illustrating a process that can be performed in order to allocate ways to the individual way groups in a manner that enables interference between multiple cache features to be alleviated. At step 250, a parameter F is input, this identifying the number of features that could interfere with each other. In the example of FIG. 2, F will be set equal to 2.

Then at step 255, the minimum number of cache ways that need to be provided by the cache storage 10 is identified as being equal to $2^F$. Accordingly, for the example of FIG. 2, the minimum number of ways that need to be provided is 4.

The granularity, i.e. the number of cache ways to be provided within each way group, can then be determined using the equation illustrated in box 255 of FIG. 4A. In particular, the granularity G is selected to be the nearest upper power of 2 to a value given by computing the square root of $W_{MIN} \cdot 2^{F-2}$. This is due to the ceiling function being applied to the exponent expression in the equation shown in box 255. For the example embodiment of FIG. 2, this will give rise to a granularity value of 2, indicating that there will be two ways in each way group when the minimum number of ways is provided.

At step 260, it is then determined whether the chosen way size differs from the minimum way size computed at step 255. If not, then the process proceeds directly to step 275 where an allocation operation is performed to allocate the individual ways to the way groups. More details of the process performed at step 275 will be discussed later with reference to FIG. 4B.

However, if at step 260 it is determined that the chosen way size is different to the minimum way size, then the process proceeds to step 265. Here, it is ensured that the selected way size is 2N times the minimum way size, where N is an integer greater than 0. In particular, the proposed way size for the cache storage will need to be adjusted as necessary to ensure that it meets that requirement at step 265. Thereafter, at step 270 the computation of the granularity can be re-performed using the actual specified way size rather than the minimum way size computed at step 255. The computation is otherwise as described earlier with reference to step 255. Considering the specific example of FIG. 3 it will be seen that rather than using the minimum way size of 4, the selected way size is 16, i.e. N is 2, and hence the requirement of box 265 is met. In accordance with the equation shown in box 270, this gives rise to a granularity size of 4, i.e. the way group size shown in the example of FIG. 3.

Following step 270, the process then proceeds to step 275 where the individual ways are allocated to the identified way groups.

Figure 4B:
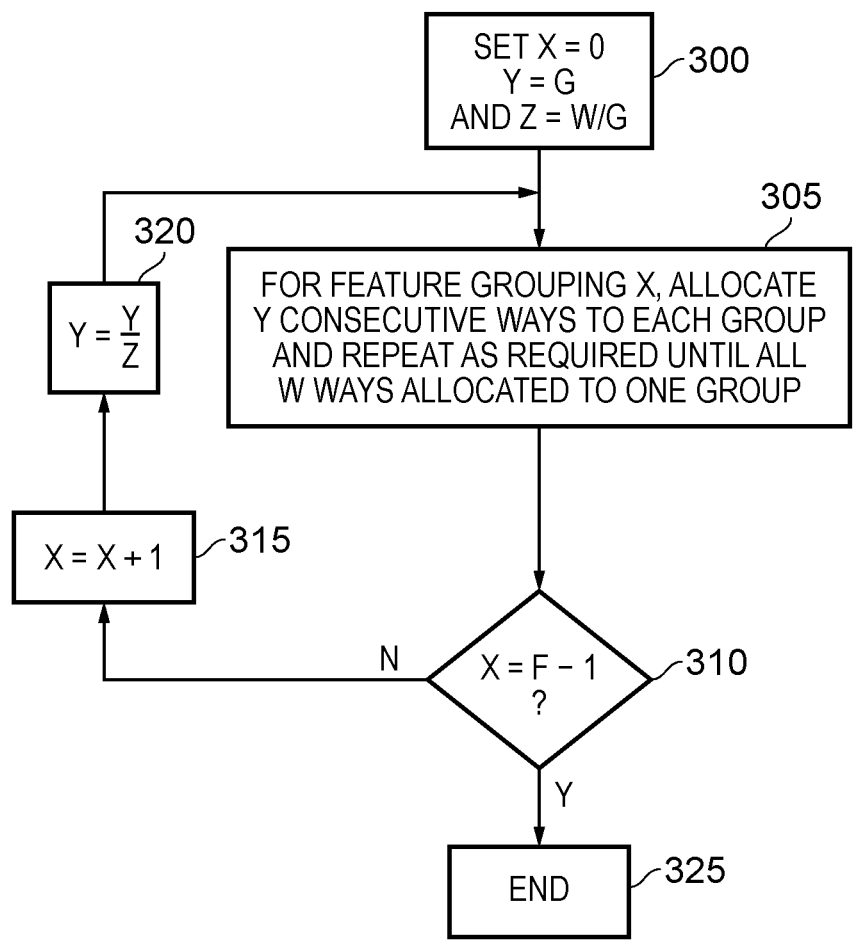

There are a number of ways in which the individual cache ways can be allocated to the identified way groups on a feature dependent basis. However, FIG. 4B is a flow diagram illustrating one example implementation. In accordance with this approach, at step 300 parameters X, Y and Z are initialised. In particular, the parameter X is set equal to 0, the parameter Y is set equal to G, i.e. the granularity value identified using the process of FIG. 4A, and the parameter Z is set equal to W/G, i.e. the chosen way size divided by the granularity value. The process then proceeds to step 305, where for the feature grouping X, Y consecutive ways are allocated to each group, with this process being repeated as required until all W ways have been allocated to one way group. Considering the example of FIG. 3, it will be appreciated on this first iteration that step 305 will allocate the ways to the way groups for feature grouping 0, which can be considered to be the partial cache power down feature grouping. As a result, four consecutive ways are allocated to each of the four groups during this process.

At step 310, it is determined whether the parameter X is equal to F−1. On the first iteration this will not be the case, and accordingly the process will proceed to step 315, where the value of X is incremented, whereafter at step 320 the value of Y is updated by dividing the current value of Y by the parameter Z. In accordance with the example shown in FIG. 3, this will result in X being updated to 1, and Y also being updated to a value of 1.

As a result, when process 305 is repeated, it will be seen that one way is allocated in turn to each group, with the process being repeated until all 16 ways have been allocated to a group, thus resulting in the mapping shown in column 220 of FIG. 3.

The above-described process is repeated until it is determined at step 310 that X is equal to F−1. For the example of FIG. 3, this will be determined after the second iteration of step 305, given that F is 2 in the example of FIG. 3. Accordingly, at that point it is determined that the mapping process had been completed, and accordingly the process ends at step 325.

As mentioned earlier in FIG. 1, additional cache features may be supported, and these cache features may or may not have the potential to be subjected to interference by one of the other cache features. FIG. 5 illustrates via table 350 an example where application of cache feature 0 may potentially interfere with the operation of cache feature 1, cache feature 2 or cache feature 3, but where the application of cache feature 1, cache feature 2 or cache feature 3 will not interfere with each other. As a result, in this example the number of features that may interfere with each other F is still equal to 2. Accordingly, assuming the chosen number of ways is 16 as per the example of FIG. 3, then the granularity is still 4, and columns 355, 360, 365 match columns 205, 210, 220 of FIG. 3. The mapping chosen for feature 2 and for feature 3 is then selectable arbitrarily with respect to the second mapping shown by the column 365 for feature 1, but still needs to ensure that that mapping differs from the mapping set out in column 360 for feature 0 in a way that prevents application of the cache feature by feature 0 from interfering with the ability of either cache feature 2 or cache feature 3 to access at least one cache way in each way group.

Whilst there is no requirement for the mapping used for feature 2 and for feature 3 to be the same as the one used for feature 1, this provides one approach for ensuring that the above condition is met, and accordingly in the example of FIG. 5 the mappings shown by the columns 370 and 375 for features 2 and 3, respectively, are chosen to be identical to the mapping used for feature 1 shown by the column 365.

As shown by the lower part of FIG. 5, it can be seen that when comparing the mapping for feature 0 and the mapping for feature 1, the difference in the mapping ensures that any way group to which feature 0 may be applied has only one cache way in common with any way group to which feature 1 may be applied.

Figure 6:
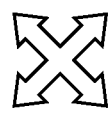

FIG. 6 provides a table 400 constructed using the approach of FIGS. 4A and 4B, for a situation where four cache features are supported that may be applied on a group-by-group basis, and where all four of the features may potentially interfere with each other. Accordingly, the value of F is 4. In this example, it is again assumed that 16 ways are provided, and performance of the steps shown in FIG. 4A results in a determination that the granularity is 8, i.e. there are 8 cache ways in each group. As a result, two groups are identified. Thereafter, application of the process described earlier with reference to FIG. 4B results in four iterations through step 305, resulting in the four mappings shown by the columns 410, 415, 420, 425 of FIG. 6. The resultant group membership for each of the two groups and for each of the four features is then listed at the bottom of FIG. 6, and it can be seen that when considering any way group for one particular feature, the membership of that way group overlaps with the membership of the way groups for any of the other features by four cache ways, i.e. any way group to which one cache feature is applied has only half of its cache ways in common with any way group to which any of the other cache features may be applied. This maintains serviceability for any one of the four cache features provided that all of the other three features keep at least one of their groups accessible.

FIG. 7 provides a table 450 illustrating the mappings provided for a yet further example. In this example, it is assumed that the number of features F that may interfere with each other is 3, and the application of the process of FIG. 4A identifies that the minimum number of ways to be provided is 8, with a resultant granularity of 4. In this example, it is assumed that the number of ways selected for the cache storage is set equal to the minimum number of ways, i.e. 8. As a result, the 8 cache ways shown in the column 455 are partitioned into two groups, with the membership of those groups differing for each of the three features as shown by the respective columns 460, 465, 470. In particular, the membership of the three features shown in FIG. 7 is determined using the approach discussed earlier with reference to FIG. 4B.

The group membership for each of the two groups, and for each of the three features, is then set out in the lower half of FIG. 7, and it can be seen that there is a two-way overlap between the group membership of one feature and the group membership of any of the other two features.

Figure 8:
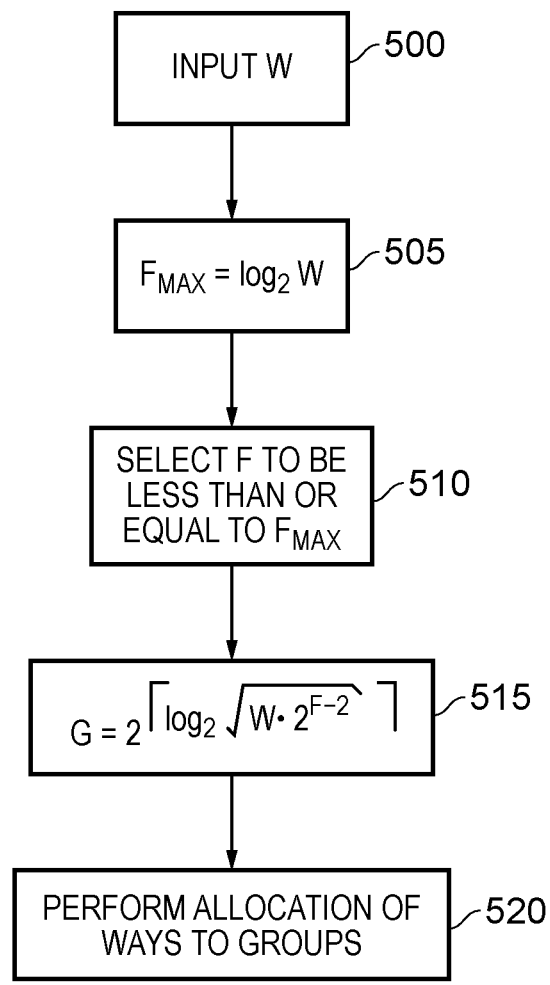
FIG. 8 is a flow diagram illustrating how cache ways may be allocated to way groups on a feature dependent basis in accordance with an alternative embodiment.

FIG. 8 is a flow diagram illustrating an alternative sequence of steps that can be performed instead of the sequence of steps discussed earlier with reference to FIG. 4A, where instead of specifying F the process starts by specifying W, i.e. the number of ways to be provided by the cache storage 10. In particular, the value of W is input at step 500, whereafter at step 505 the maximum number of interfering features $F_{MAX}$ is determined as $\log_2 W$. Thereafter, at step 510 the number of features that are to be supported is selected to be less than or equal to $F_{MAX}$.

Then, at step 515 the granularity size is computed using the same computation as discussed earlier with reference to steps 255 and 270 of FIG. 4A. Thereafter, the process proceeds to step 520 where an allocation process is performed in order to allocate the individual cache ways to the various way groups on a feature dependent basis. Step 520 can be implemented for example by using the approach discussed earlier with reference to FIG. 4B.

From the above-described embodiments, it will be appreciated that such embodiments provides an effective mechanism for supporting the use of multiple cache features that can be applied on a way group by way group basis, where the actions taken whilst applying one cache feature could interfere with the ability of another cache feature to continue to access the various way groups. In particular, the described techniques change the way in which the cache ways are mapped into the individual way groups, on a feature-by-feature basis. As a result, different mappings can be selected for multiple cache features so as to prevent application of a cache feature to the way groups by one cache feature circuitry from interfering with the ability of another cache feature circuitry to access at least one cache way in each of its way groups. Hence, considering the total pool of ways provided by the cache storage, such an approach can guarantee that a feature can access at least one way in each way group, independent of the state of any other features acting on the same pool of ways.

Such an approach enables the effective utilisation of multiple cache features that each operate on individual way groups. For example, such an approach enables the energy consumption benefits of using a partial cache power down feature to be achieved, whilst also supporting the potential performance benefits resulting from use of a cache partitioning feature.

Additional features may also be supported. For example, the apparatus may support a background cache maintenance feature (that for example can clean cache lines marked as "dirty") that can operate on individual way groups, and a further mapping can be provided for that extra feature. Alternatively, if the background cache maintenance feature is considered not to interfere with the cache partitioning feature, both of those features may be allocated the same mapping.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
cache storage comprising a plurality of cache ways and organised as a plurality of way groups, each way group comprising multiple cache ways from said plurality of cache ways;
first cache feature circuitry configured to implement as a first cache feature that is applied to the way groups, a partial cache power down feature in order to selectively inhibit access to the cache ways of one or more of the way groups as defined by a first mapping;
second cache feature circuitry configured to implement as a second cache feature that is applied to the way groups, a cache partitioning feature that identifies, for each source of cache accesses, a subset of the way groups, as defined by a second mapping different from the first mapping, to be used by that source, wherein the use of the second mapping different from the first mapping ensures that when the partial cache power down feature is employed, each source is still able to access at least one cache way; and
way group control circuitry configured to provide the first mapping defining which cache ways belong to each way group when the first cache feature is applied to the way groups and the second mapping different from the first mapping defining which cache ways belong to each way group when the second cache feature is applied to the way groups, the first mapping and the second mapping being selected to ensure that any way group to which the first cache feature is applied has no more than half of its cache ways in common with any way group to which the second cache feature is applied,
wherein the way group control circuitry is configured, for each mapping, to allocate each cache way to one way group, and wherein the first cache feature is applicable to any of the way groups defined by the first mapping and the second cache feature is applicable to any of the way groups defined by the second mapping.

2. An apparatus as claimed in claim 1, wherein the first mapping and the second mapping are selected to ensure that any way group to which the first cache feature is applied has only one cache way in common with any way group to which the second cache feature is applied.

3. An apparatus as claimed in claim 1, further comprising:
at least one further cache feature circuitry to implement at least one further cache feature that is applied to the way groups;
the way group control circuitry being further configured to provide at least one further mapping defining which cache ways belong to each way group when said at least one further cache feature is applied to the way groups.

4. An apparatus as claimed in claim 3, wherein the first mapping and each further mapping are selected so as to prevent application of a cache feature to the way groups by one of the first cache feature circuitry and the corresponding further cache feature circuitry from interfering with the ability of the other of the first cache feature circuitry and the corresponding further cache feature circuitry to access at least one cache way in each of the way groups.

5. An apparatus as claimed in claim 4, wherein the second mapping and each further mapping are selected so as to prevent application of a cache feature to the way groups by one of the second cache feature circuitry and the corresponding further cache feature circuitry from interfering with the ability of the other of the second cache feature circuitry and the corresponding further cache feature circuitry to access at least one cache way in each of the way groups.

6. An apparatus as claimed in claim 4, wherein each further mapping is arbitrarily selectable with respect to the second mapping.

7. An apparatus as claimed in claim 6, wherein said at least one further mapping is selected to be the same as the second mapping.

8. An apparatus as claimed in claim 1, wherein a minimum number of cache ways $W_{MIN}$ provided by the cache storage is $2^F$, where F is the number of cache features implemented by the apparatus for which different mappings are to be provided by the way group control circuitry.

9. An apparatus as claimed in claim 8, wherein said plurality of cache ways W comprises either $W_{MIN}$ or $2NW_{MIN}$, where N is a positive integer greater than 0.

10. An apparatus as claimed in claim 9, wherein the number of cache ways in each way group is selected to be the nearest upper power of two to a value given by computing the square root of $W \cdot 2^{F-2}$.

11. An apparatus as claimed in claim 1, wherein the cache storage is one of a data cache, an instruction cache, a unified cache or a Translation lookaside buffer (TLB).

12. A method of operating an apparatus having cache storage comprising a plurality of cache ways and organised as a plurality of way groups, each way group comprising multiple cache ways from said plurality of cache ways, the method comprising:
implementing, as a first cache feature that is applied to the way groups, a partial cache power down feature in order to selectively inhibit access to the cache ways of one or more of the way groups as defined by a first mapping;
implementing, as a second cache feature that is applied to the way groups, a cache partitioning feature that identifies, for each source of cache accesses, a subset of the way groups, as defined by a second mapping different from the first mapping, to be used by that source, wherein the use of the second mapping different from the first mapping ensures that when the partial cache power down feature is employed, each source is still able to access at least one cache way;
employing the first mapping defining which cache ways belong to each way group when the first cache feature is applied to the way groups and the second mapping different from the first mapping defining which cache ways belong to each way group when the second cache feature is applied to the way groups; and
selecting the first mapping and the second mapping to ensure that any way group to which the first cache feature is applied has no more than half of its cache ways in common with any way group to which the second cache feature is applied, the selecting comprising, for each mapping, allocating each cache way to one way group,
wherein the first cache feature is applicable to any of the way groups defined by the first mapping and the second cache feature is applicable to any of the way groups defined by the second mapping.

13. An apparatus, comprising:
cache storage means for providing a plurality of cache ways and for being organised as a plurality of way groups, each way group comprising multiple cache ways from said plurality of cache ways;
first cache feature means for implementing as a first cache feature that is applied to the way groups, a partial cache power down feature in order to selectively inhibit access to the cache ways of one or more of the way groups as defined by a first mapping;

second cache feature means for implementing as a second cache feature that is applied to the way groups, a cache partitioning feature that identifies, for each source of cache accesses, a subset of the way groups, as defined by a second mapping different from the first mapping, to be used by that source, wherein the use of the second mapping different from the first mapping ensures that when the partial cache power down feature is employed, each source is still able to access at least one cache way; and way group control means for providing the first mapping defining which cache ways belong to each way group when the first cache feature is applied to the way groups and the second mapping different from the first mapping defining which cache ways belong to each way group when the second cache feature is applied to the way groups, the first mapping and the second mapping being selected to ensure that any way group to which the first cache feature is applied has no more than half of its cache ways in common with any way group to which the second cache feature is applied, wherein the way group control means is configured, for each mapping, to allocate each cache way to one way group, and wherein the first cache feature is applicable to any of the way groups defined by the first mapping and the second cache feature is applicable to any of the way groups defined by the second mapping.

* * * * *